United States Patent [19]
Burrows et al.

[11] Patent Number: 5,878,099
[45] Date of Patent: Mar. 2, 1999

[54] APPARATUS FOR PERFORMING WORK IN A NUCLEAR REACTOR

[75] Inventors: Brian H. Burrows, Campbell; Michael Y. Suekawa, San Jose, both of Calif.

[73] Assignee: General Electric Company, Schenectady, N.Y.

[21] Appl. No.: 853,768

[22] Filed: May 9, 1997

Related U.S. Application Data

[60] Provisional application No. 60/024,334 Aug. 22, 1996.

[51] Int. Cl.⁶ .................................................... G21C 19/00
[52] U.S. Cl. ........................................... 376/260; 376/249
[58] Field of Search ..................................... 376/249, 260

[56] References Cited

U.S. PATENT DOCUMENTS 5,586,155  12/1996  Erbes et al. ............................... 376/249

*Primary Examiner*—Daniel D. Wasil
*Attorney, Agent, or Firm*—Armstrong, Teasdale, Schlafly & Davis

[57] ABSTRACT

Methods and apparatus for enabling repeatable positioning of inspection and other service tools on an inner diameter of a shroud wall between a top guide and core plate in a boiling water nuclear reactor are described. In one embodiment, the delivery system includes a positioning unit configured to attach to a shroud head flange, a strong back assembly, and a rail assembly connected to the strong back assembly. The positioning unit includes a horizontal member having a plurality of slots and circular shaped openings to mate with seismic pins on the shroud head flange, a radial member and a z-axis adjustment assembly. The radial member extends from the horizontal member to the z-axis adjustment assembly. The z-axis adjustment assembly includes a mast coupling and an elongate screw threadedly attached to the coupling so that as the screw rotates, the coupling moves relative to the radial member. The strong back assembly includes a mast and an extension unit. The mast attaches to the coupling of the positioning unit, and the extension unit is connected to one end of the mast. The mast transfers the load between the extension unit and the positioning unit, thereby causing the shroud to support the weight of the tools. The rail assembly is connected to the extension unit, and the rail assembly includes a rail and a mounting plate movably secured to the rail. The rail assembly further includes a motor coupled to the mounting plate for moving the mounting plate relative to, and along, rail. The rail assembly also includes a plurality of suction cups for removable attachment to an inner wall of the shroud.

14 Claims, 10 Drawing Sheets

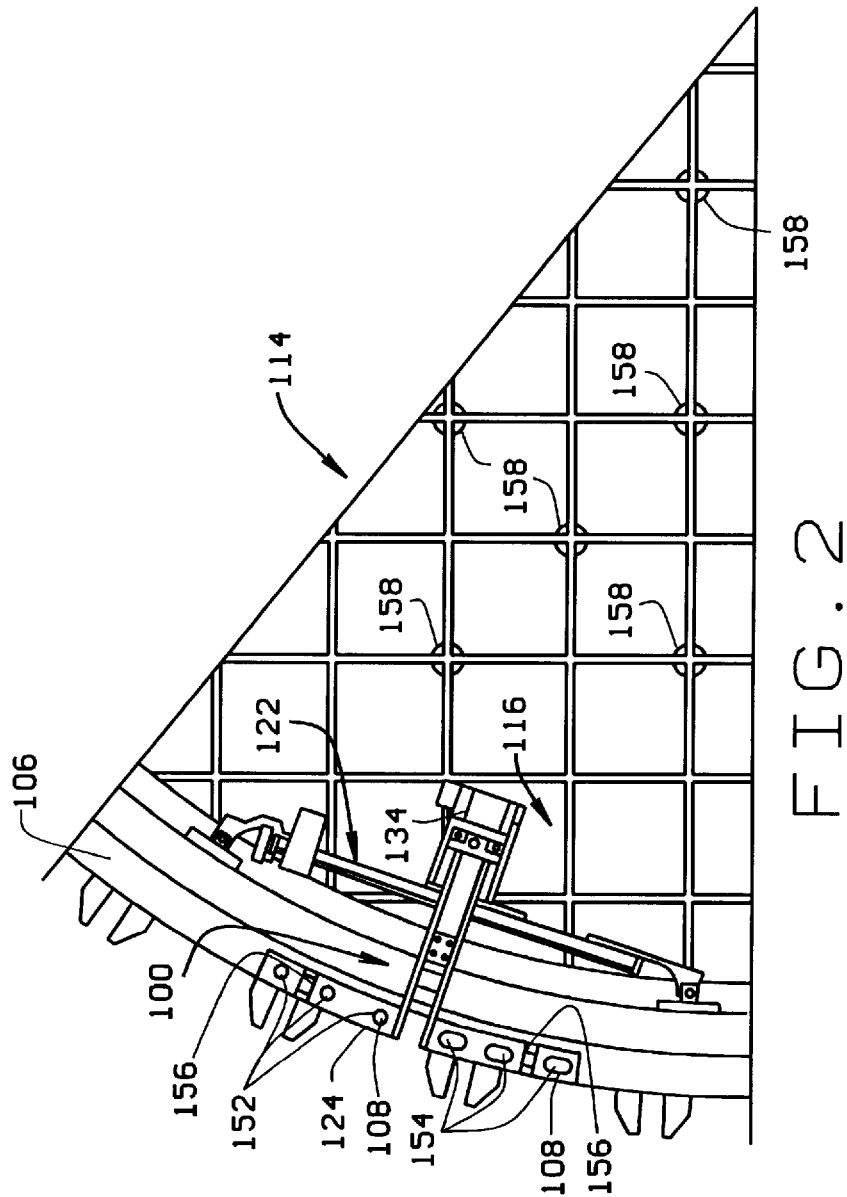

APPARATUS FOR PERFORMING WORK IN A NUCLEAR REACTOR

This application claims the benefit of U.S. Provisional application No. 60/024,334, filed Aug. 22, 1996.

FIELD OF THE INVENTION

This invention relates generally to nuclear reactor servicing and, more particularly, to performing work on an inner surface of a nuclear reactor core shroud.

BACKGROUND OF THE INVENTION

Repairs and inspections performed within the reactor pressure vessel (RPV) of a boiling water reactor (BWR) typically are performed with ropes and poles for manual manipulation of simple tools or manual delivery of dedicated automated tools. More specifically, the RPV typically has a generally cylindrical shape and is closed at both ends, e.g., by a bottom head and a removable top head. A top guide typically is spaced above a core plate within the RPV. Many other components, e.g., steam dryers, also are located in the RPV.

During reactor shut down, and if it is desired to inspect or repair certain components within the RPV, the RPV top head is removed. Other components such as the steam dryers may also be removed to enable access to RPV locations between the top guide and core plate or locations below the core plate. To perform the inspections and repairs, an operator typically stands on a bridge positioned over the RPV and using ropes and poles, which may extend more than thirty (30) feet below the bridge into the RPV, inspect or repair certain RPV components. The ability to perform such inspections and repairs greatly depends on the dexterity of the operator.

In addition, it is extremely difficult to precisely position a tool within the RPV using ropes and poles. Even if the tool is accurately positioned for one operation in a desired location, it is extremely difficult to then precisely position another tool at the exact same location to perform a next step in the operation. Also, each inspection and repair operation typically requires the design and fabrication of special, dedicated tools. Designing and fabricating tools for each task is costly.

Due to the difficulty in even accessing certain locations within the RPV, performing repairs and inspections at such locations can be time consuming. It is desirable, of course, to limit the time required to perform repairs and inspections in the RPV since the reactor must be shut down to perform such tasks. Reducing the amount of time required to perform such inspections and repairs also would facilitate reducing the operator radiation exposure per task.

SUMMARY OF THE INVENTION

These and other objects are attained by a delivery system which, in one embodiment, enables repeatable positioning of inspection and other service tools on an inner diameter of a shroud wall between a top guide and core plate in a boiling water nuclear reactor. The delivery system enables access to 360 degrees of the shroud inner wall with only a few installations, and the delivery system can be used in connection with a number of different tools without having to remove the system from the reactor for reconfiguration.

More specifically, and in one embodiment, the delivery system includes a positioning unit configured to attach to a shroud head flange, a strong back assembly, and a rail assembly connected to the strong back assembly. The positioning unit includes a horizontal member having a plurality of slots and circular shaped openings to mate with seismic pins on the shroud head flange, a radial member and a z-axis adjustment assembly. The radial member extends from the horizontal member to the z-axis adjustment assembly. The z-axis adjustment assembly includes a mast coupling and an elongate screw threadedly attached to the coupling so that as the screw rotates, the coupling moves relative to the radial member. The z-axis adjustment assembly further includes a scale and pointer assembly for indicating a location of the coupling.

The strong back assembly includes a mast and an extension unit. The mast attaches to the coupling of the positioning unit, and the extension unit is connected to one end of the mast. The mast transfers the load between the extension unit and the positioning unit, thereby causing the shroud to support the weight of the tools. The extension unit includes a four-bar linkage, and a hydraulic cylinder controls movement of the linkage. The extension unit further includes a rotation assembly for rotating the rail assembly relative to mast.

The rail assembly is connected to the extension unit, and the rail assembly includes a rail and a mounting plate movably secured to the rail. The rail assembly further includes a motor coupled to the mounting plate for moving the mounting plate relative to, and along, rail. The rail assembly also includes a plurality of suction cups for removable attachment to an inner wall of the shroud.

To position the rail assembly at a desired location within the reactor, the rail assembly is positioned in a substantially vertical position so that the rail assembly and a portion of the mast can pass through an opening in the nuclear reactor top guide and lowered to a desired elevation within the reactor. Once the rail assembly is at a desired elevation, the extension unit is partially extended so that the rail assembly is moved towards the shroud wall. The rail assembly is then rotated to a desired orientation relative to the shroud wall. The rail assembly can then be secured to the shroud wall by further extending the extension unit until the rail assembly suction cups firmly contact the shroud wall. The tool engaged to the rail assembly mounting plate then can be controlled to perform the desired operations.

The above described delivery system does not heavily rely on the dexterity of the operator and facilitates precise positioning of a tool within a RPV. Such delivery system also facilitates eliminating a need for special, dedicated tools which, in the past, typically are required for each different task. The delivery system also is believed to facilitate reducing the amount of time required to perform inspections and repairs and reducing the operator radiation exposure per task.

BRIEF DESCRIPTION OF THE DRAWINGS

FIG. 2 is a top view of the delivery system illustrated in FIG. 1 with parts cut away.

DETAILED DESCRIPTION OF THE DRAWINGS

Generally, and in one aspect, the present invention is directed to a delivery system which enables repeatable positioning of inspection or other service tools at a specified region on an inner diameter of a shroud wall between a top guide and core plate in a boiling water nuclear reactor. The delivery system enables access to 360 degrees of the shroud inner wall with only a few installation, and the delivery system can be used in connection with a number of different tools without having to remove the system from the reactor for reconfiguration.

Figure 1:
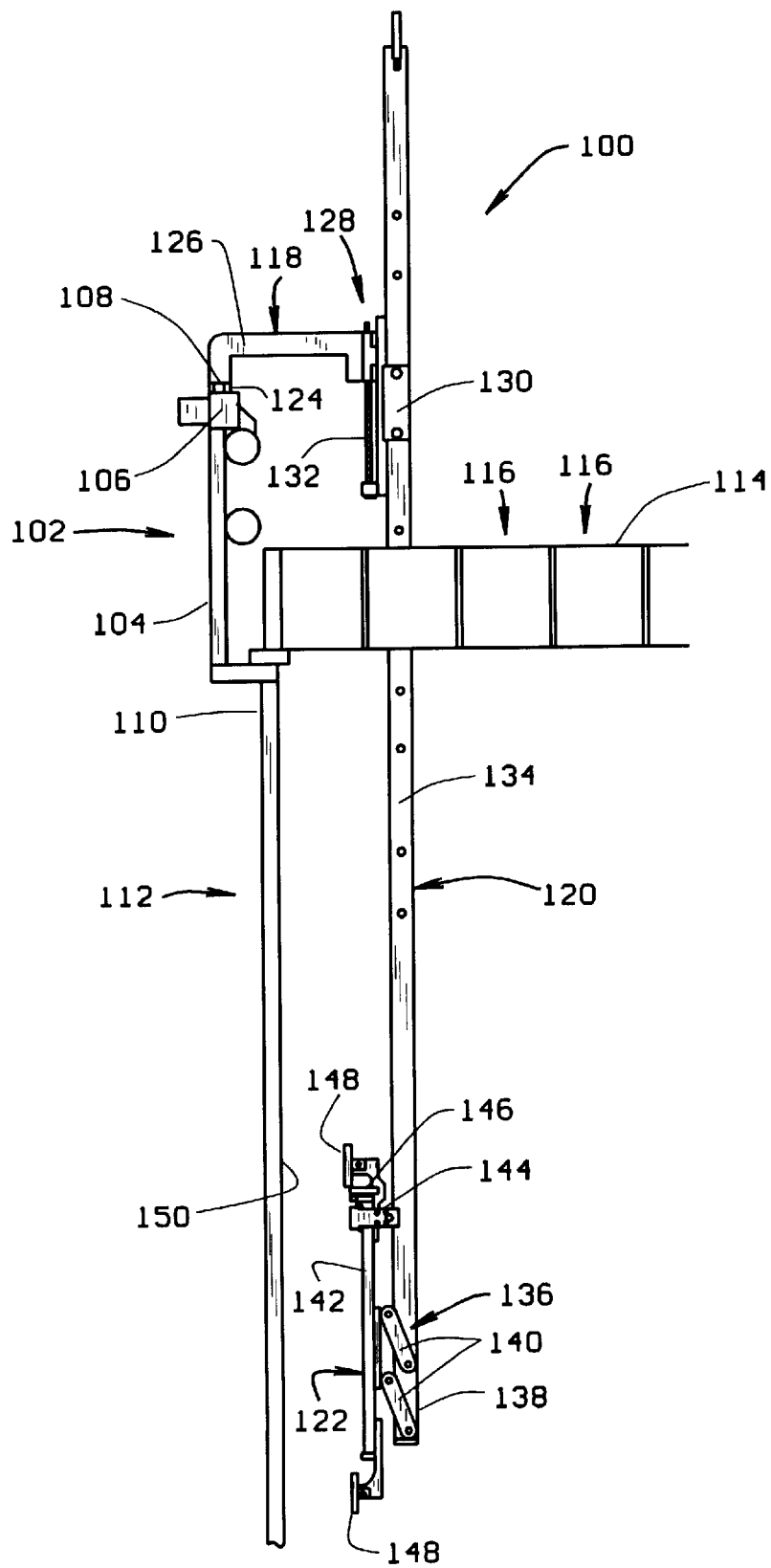
FIG. 1 is a front view of a delivery system mounted in a nuclear reactor in accordance with one embodiment of the present invention.

FIG. 1 is a front view of one such delivery system embodiment 100 mounted to a nuclear reactor shroud head flange assembly 102. Shroud head flange assembly 102 includes a shroud extension 104 and a shroud head support flange 106. A plurality of seismic pins 108 are located on shroud head support flange 106. Shroud extension 104 is secured to a shroud wall 110 of a shroud 112 at a location just below a top guide 114. Both top guide 114 and shroud 112 are substantially cylindrical. Top guide 114 has a plurality of openings 116 extending therethrough. Shroud 112 has an outer diameter substantially equal to an outer diameter of top guide 114.

Delivery system 100 includes a positioning unit 118 configured to attach to shroud head flange 106, a strong back assembly 120, and a rail assembly 122 connected to strong back assembly 120. Positioning unit 118 includes a horizontal member 124 having a plurality of slots and circular shaped openings (not shown in FIG. 1) therein to mate with seismic pins 108, a radial member 126 and a z-axis adjustment assembly 128. Radial member 126 extends from horizontal member 124 to z-axis adjustment assembly 128. Z-axis adjustment assembly 128 includes a mast coupling 130 and an elongate screw 132 threadedly attached to coupling 130 so that as screw rotates 132, coupling 130 moves relative to radial member 126. Z-axis adjustment assembly 128 further includes a scale and pointer assembly (not shown in FIG. 1) for indicating a location of coupling 130.

Strong back assembly 120 includes a mast 134 and an extension unit 136. Mast 134 attaches to coupling 130 of positioning unit 118, and extension unit 136 is connected to one end 138 of mast 134. Mast 134 transfers the load between extension unit 136 and positioning unit 118, thereby causing shroud 112 to support the weight of the tools. Extension unit 136 includes a four-bar linkage 140, and a hydraulic cylinder (not shown in FIG. 1) controls movement of linkage 140. Extension unit 136 further includes a rotation assembly (not shown in FIG. 1) for rotating rail assembly 122 relative to mast 134.

Rail assembly 122 is connected to extension unit 136, and rail assembly 122 includes a rail 142 and a mounting plate 144 movably secured to rail 142. Rail assembly 122 further includes a motor 146 coupled to mounting plate 144 for moving mounting plate 144 relative to, and along, rail 142. Rail assembly 122 also includes a plurality of suction cups 148 for removable attachment to inner wall 150 of shroud 112.

FIG. 2 is a top view of delivery system 100 illustrated in FIG. 1 with parts of the reactor cut away. As clearly shown in FIG. 2, horizontal member 124 includes openings 152 and slots 154, some of which have respective seismic pins 108 inserted therethrough. Also, hydraulic units 156 are mounted to horizontal member 124 as shown in FIG. 2. As described hereinafter in more detail, hydraulic units 156 facilitate securing delivery system 100 within the reactor. Top guide 114, as shown in FIG. 2, is substantially configured as a grid and has a plurality of openings 116 extending therethrough. A plurality of local power range monitors (LPRMs) 158 are shown as being secured to top guide 114. Mast 134 extends through opening 116 in top guide 114 and rail assembly 122 is located below top guide 114.

Figure 3A:
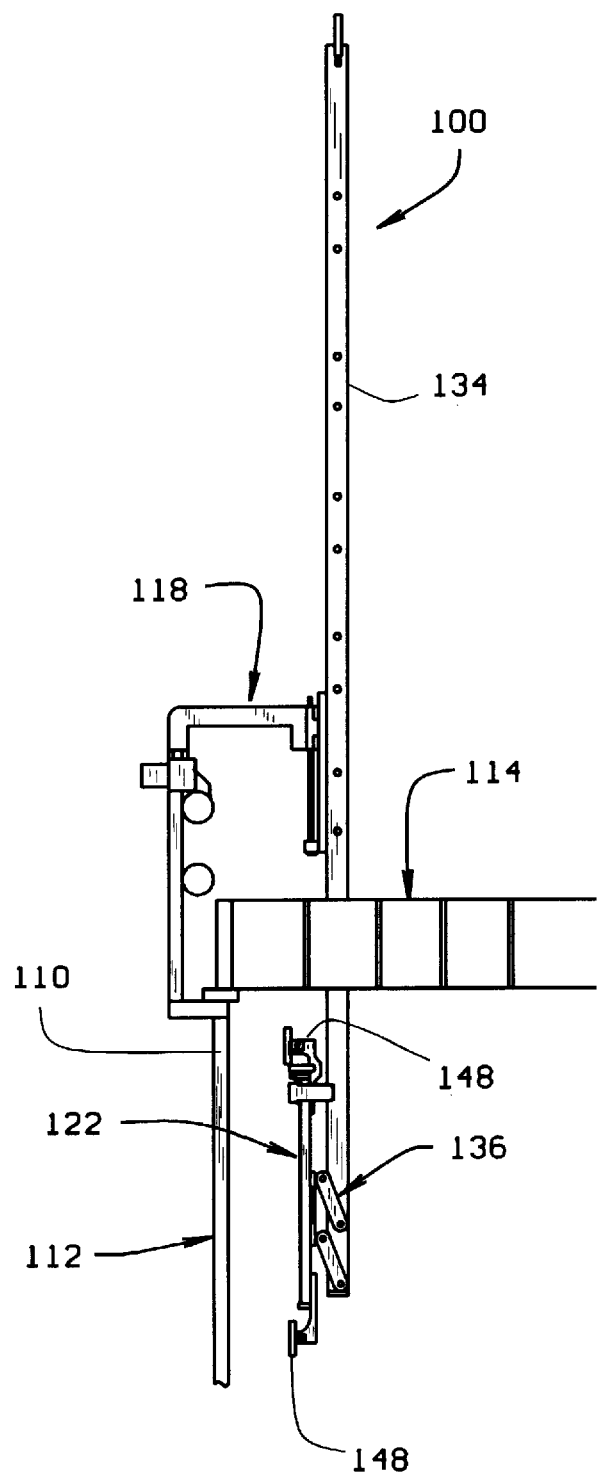
FIGS. 3A, 3B and 3C are front views of the delivery system shown in FIG. 1 with the rail assembly located in different positions.
Figure 3B:
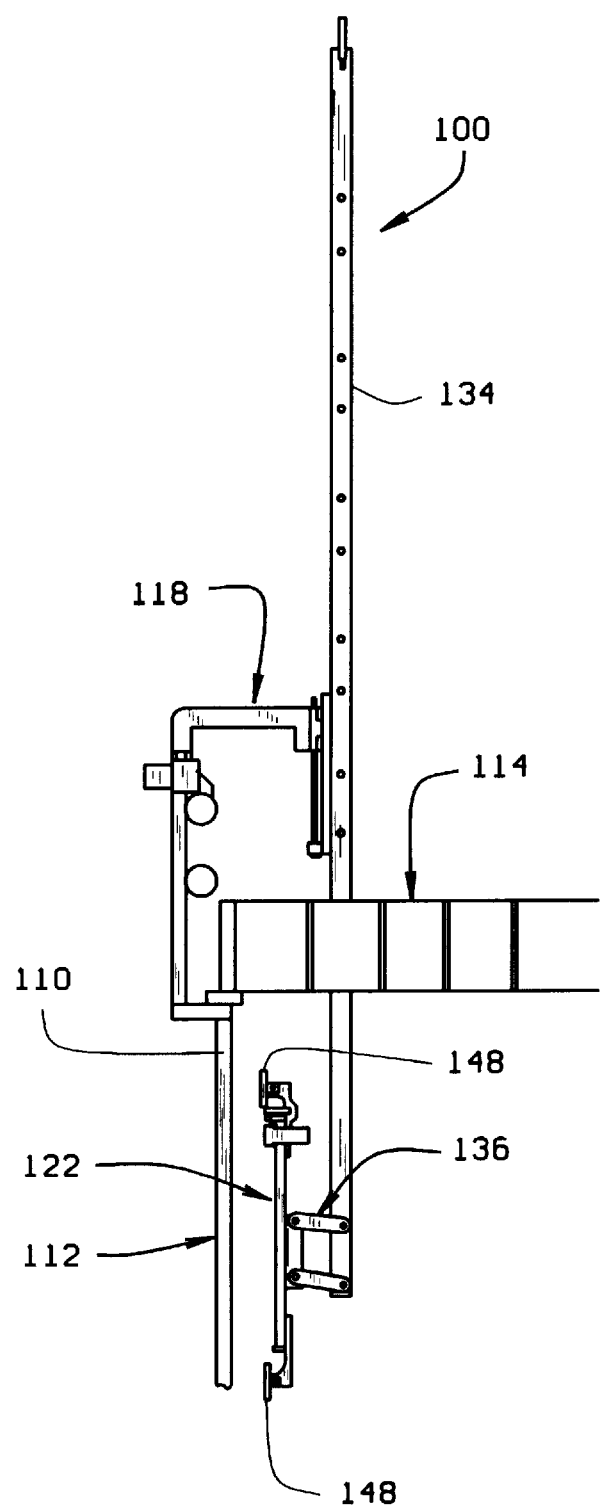
Figure 3C:
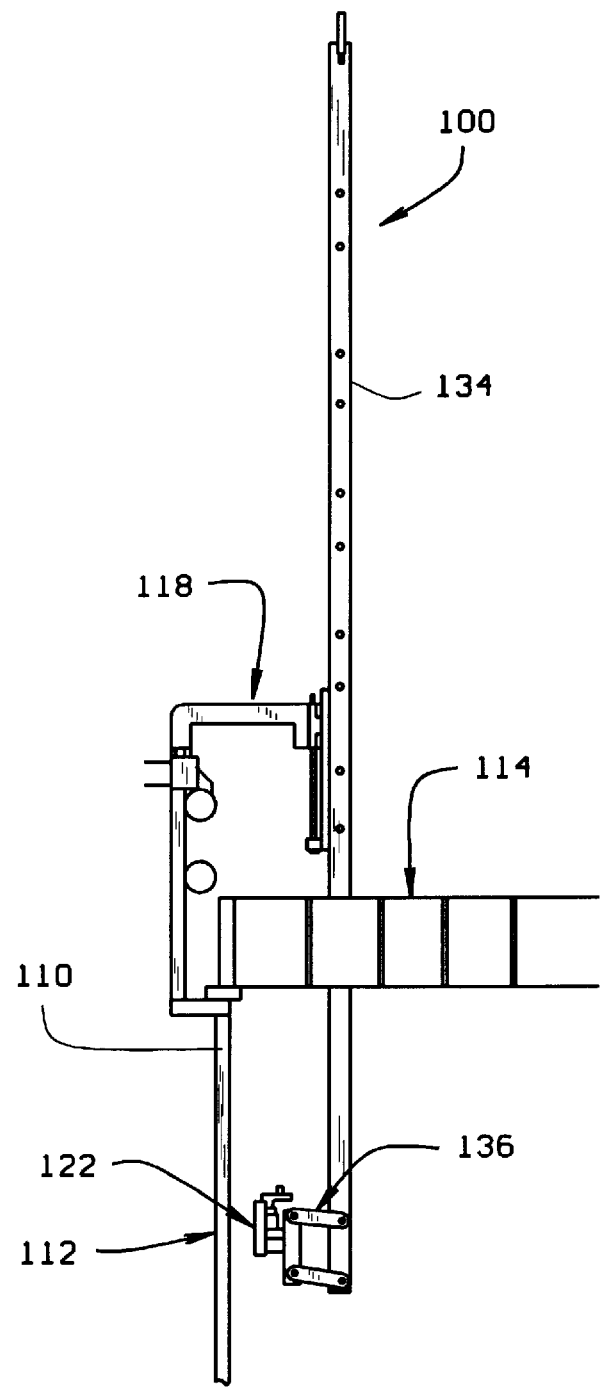

FIGS. 3A, 3B and 3C are front views of delivery system 100 with rail assembly 122 located in different positions. More specifically, in FIG. 3A, rail assembly 122 is located in a substantially vertical position so that rail assembly 122 can be passed through opening 116 in top guide 114 and then lowered to a desired elevation or removed from the reactor. In FIG. 3B, extension unit 136 is partially extended so that rail assembly 122 is moved towards shroud wall 110. As shown in FIG. 3C, rail assembly 122 is then rotated to a desired orientation relative to shroud wall 110. Rail assembly 122 can then be secured to shroud wall 110, as described hereinafter in more detail, by further extending extension unit 136 until suction cups 148 firmly contact shroud wall 110. A vacuum is then pulled through cups 148, as described hereinafter in more detail, so that suction cups 148 are securely engaged to shroud wall 110.

Figure 4A:
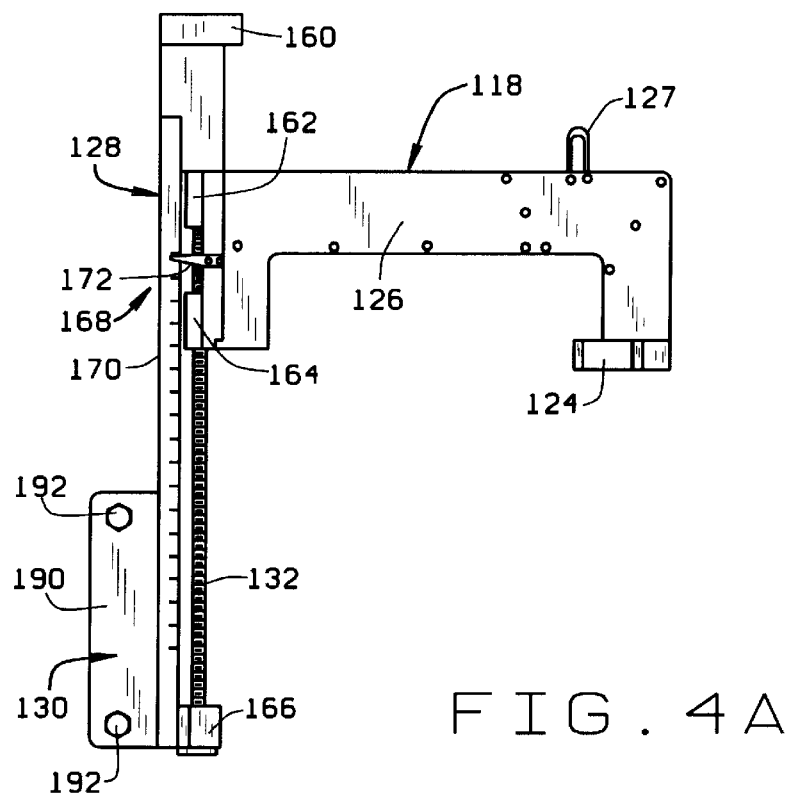
FIGS. 4A and 4B are side and top views, respectively, of the strong back positioner which forms part of the delivery system shown in FIG. 1.
Figure 4B:
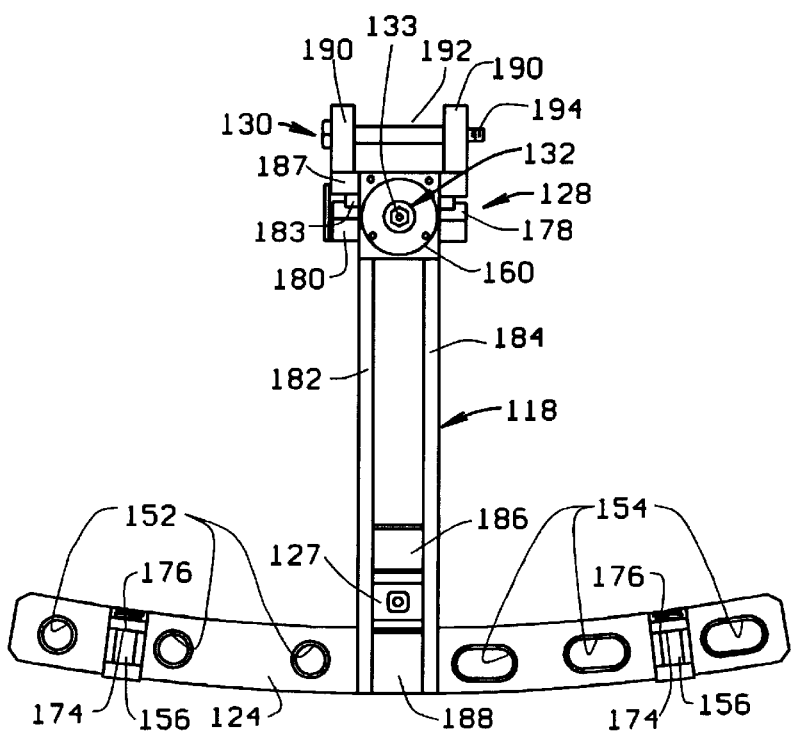

FIGS. 4A and 4B are side and top views, respectively, of positioning unit 118, sometimes referred to herein as a strong back positioner, which forms part of delivery system 100 shown in FIG. 1. As shown in FIG. 4A, a square shaft 127 is secured to radial member 126. Shaft 127 can be gripped using a remotely operated handling pole to position system 100. Z-axis adjustment assembly 128 includes mast coupling 130 and elongate screw 132 threadedly attached to coupling 130. An upper portion (not shown) of screw 132 is located within a guide 160 and has a head (not shown in FIG. 4A) configured to be attached to a remotely operated handling pole for rotating screw 132. Screw 132 extends through first and second portions 162 and 164 of radial member 118 and to a flange mount bearing unit 166. Flange mount bearing unit 166 is engaged to, or integral with, mast coupling 130. A scale and pointer assembly 168 includes a scale 170 and a pointer 172 for indicating a location of coupling 130.

Referring to FIG. 4B, and in one embodiment, horizontal member 124 has three openings 152 and three slots 154 which are spaced to enable engagement with two seismic pins (not shown in FIG. 4B) for fixing the circumferential position of delivery system 100. Multiple opening 152 and slot 154 combinations enable flexibility and addition shroud circumference coverage. Also, hydraulic units 156 include shafts 174 and pads 176, and are secured to horizontal member 124, sometimes referred to herein as a positioning plate. When horizontal member 124 is positioned within a reactor, hydraulic units 156 are operated so that pads 176 are firmly in contact with a steam dam (not shown in FIG. 4B). The resultant force between the steam dam, the seismic pins and positioning units 156 clamps delivery system 100 in place.

Z-axis adjustment assembly 128 also includes a linear rail 178 which is threadedly engaged to z-axis adjustment screw 132. Linear rail 178 is secured to a truck plate 180 which is engaged, e.g., securely fastened, to plates 182 and 184 of radial member 118. A short plate 186 and a long plate 188 provide rigidity for plates 182 and 184. A z-axis linear slide 183 is movably secured to linear rail 178 and is mounted to a base plate 187. A head 133 of screw 132 is located within guide 160 and is configured to be engaged by a tool, such as a remotely operated handling pole.

Coupling 130 includes two plates 190 having aligned openings (not shown in FIG. 4B). Plates 190 are mounted to base plate 187. Pins 192 having threaded ends 194 extend through respective aligned openings for engaging mast 134 (see FIG. 1) to coupling 130. As screw rotates, z-axis linear slide 183 moves relative to, and along, rail 178. Of course, base plate 187 and coupling 130 move with slide 183.

Figure 5A:
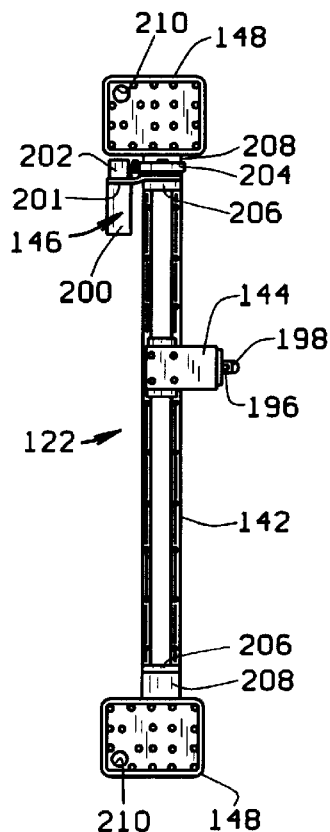
FIGS. 5A, 5B and 5C are front, side and top views, respectively, of the rail assembly which forms part of the delivery system shown in FIG. 1.
Figure 5B:
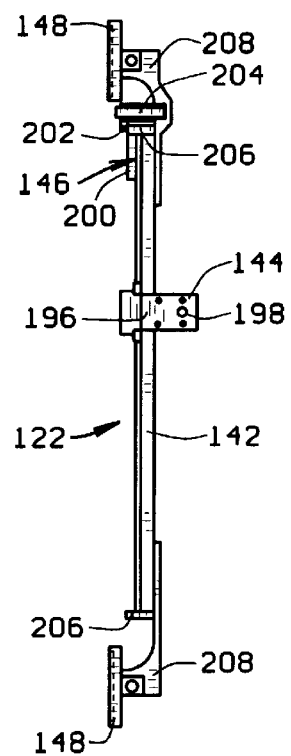
Figure 5C:
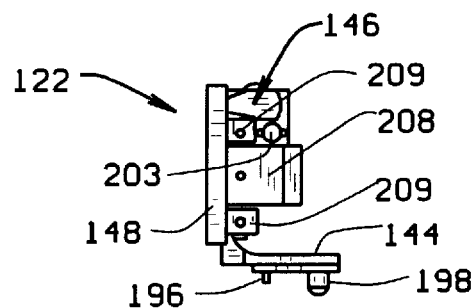

FIGS. 5A, 5B and 5C are front, side and top views, respectively, of rail assembly 122. As shown in FIGS. 5A, 5B and 5C, rail assembly includes mounting plate 144 for being secured to extension unit 136, and mounting plate 144 is movable relative to rail 142. In one embodiment, rail 142 has approximately about 800 mm of stroke to enable mounting plate 144 to encompass approximately 20 degrees of the shroud inner diameter.

Mounting plate 144 includes an alignment pin 196 and a collet closer pin 198 for facilitating engagement with a tool (not shown). More specifically, collet closer pin 198 engages to a collet closer of the tool which provides the necessary clamping force to secure the tool to rail assembly 122. Alignment pin 196 engages a bushing in the tool and prevents the tool from rotating relative to rail assembly 122 during operation.

Motor 146, which may be a 100 W DC Maxon type motor, controls movement of mounting plate 144 relative to rail 142. Motor 146 includes a sealed motor can 200 wired to a leak-proof junction box, and is mounted to a mounting plate 201. A motor pulley bracket 202 including a pulley driven by motor 146 also is mounted to plate 201 and the motor pulley is coupled to an idler pulley 203 and a rail pulley 204 by a belt. A resolver (not shown) provides feedback to enable a determination of the z-axis position of mounting plate 144. A limit, or cut-out, switch (not shown) secured to rail 142 and electrically connected to motor 146 and mechanical hard stops 206 prevent overtravel of mounting member 144.

Suction cups 148 mounted on extensions 208 are provided for removable attachment to inner wall of shroud. Suction cups 148 are pivotally mounted to extensions 208 by stainless steel pins 209 so that cups 148 pivot about the z-axis to accommodate the shroud curvature. Suction cups 148 pivot only about the z-axis, however, to provide rigidity. Each suction cup 148 includes an opening 210 therein, and a tube (not shown) extends from each suction cup opening 210 to an air-powered double diaphragm pump (not shown). In operation, the pumps draw a vacuum in each cup 148 when cups 148 are secured to the shroud wall. The vacuum forces securely maintain rail assembly 122 in a selected position.

Figure 6A:
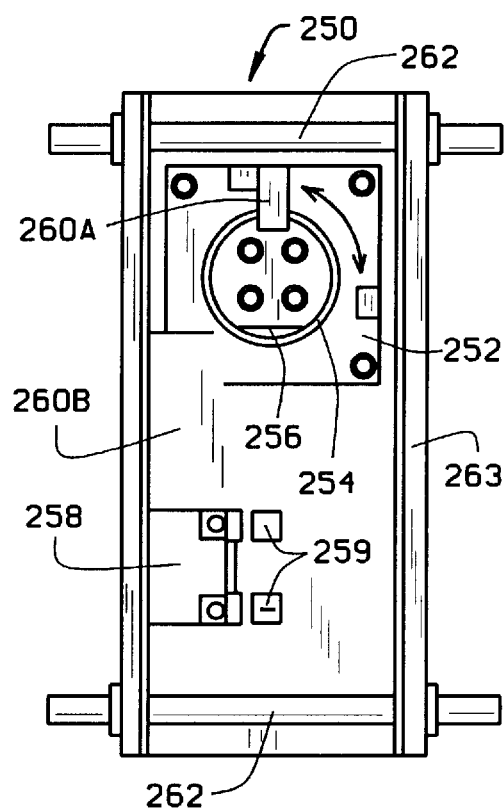
FIGS. 6A, 6B and 6C are front, side and top views, respectively, of the rotation assembly of the rail assembly illustrated in FIGS. 5A, 5B and 5C.
Figure 6B:
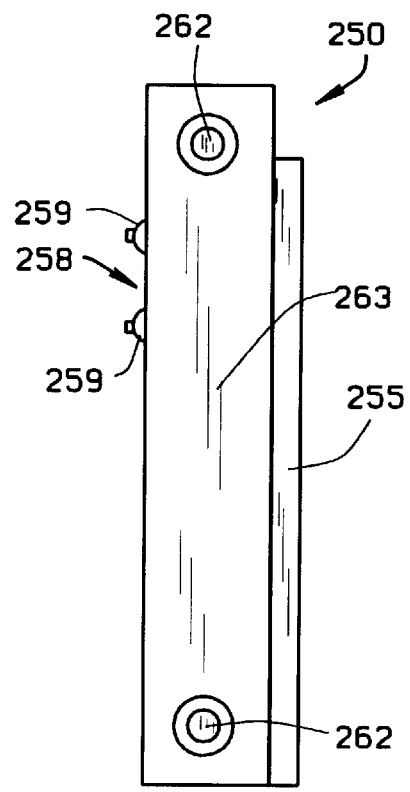
Figure 6C:
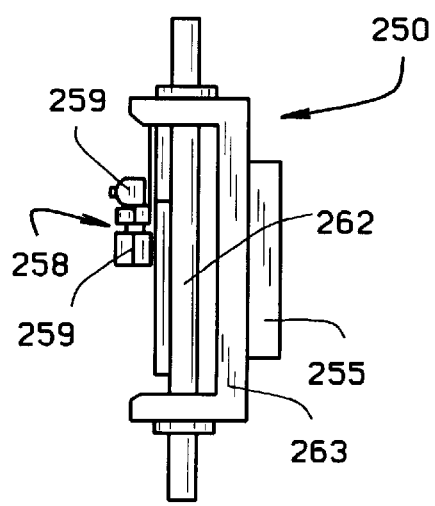

FIGS. 6A, 6B and 6C are front, side and top views, respectively, of rotation assembly 250 of rail assembly 122. Rotation assembly 250 includes a rotation cup assembly 252 which mounts to rail 142 of rail assembly 122. A rotation bearing 254 is secured within a bearing retainer 256, and bearing 254 rotates on roller bearings positioned within a rotation plate 255. A rotation control cylinder 258 having hydraulic cylinder fittings 259 is connected to, and controls rotation of, rotation bearing 254. Rotation stops 260A and 260B limit rotation of rotation bearing 254. Pins 262 are provided to engage linkage 140, and are secured to housing 263.

Figure 7A:
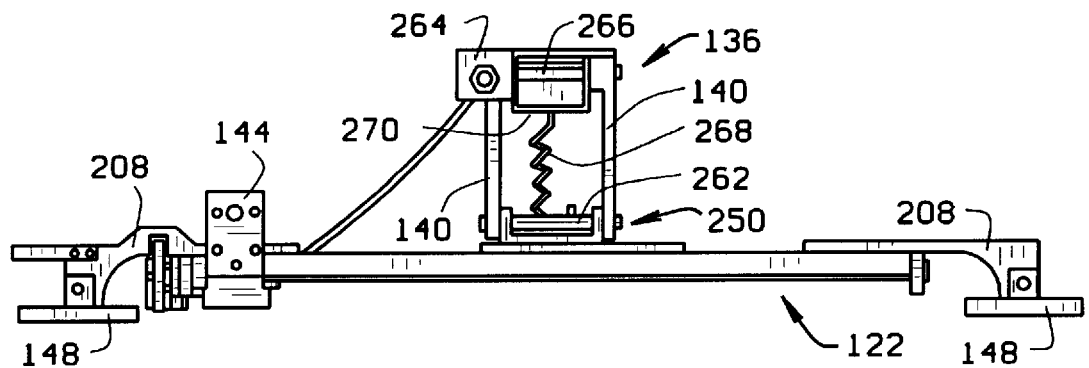
FIGS. 7A and 7B are front and side views, respectively, of the extension assembly of the rail assembly illustrated in FIGS. 5A, 5B and 5C.
Figure 7B:
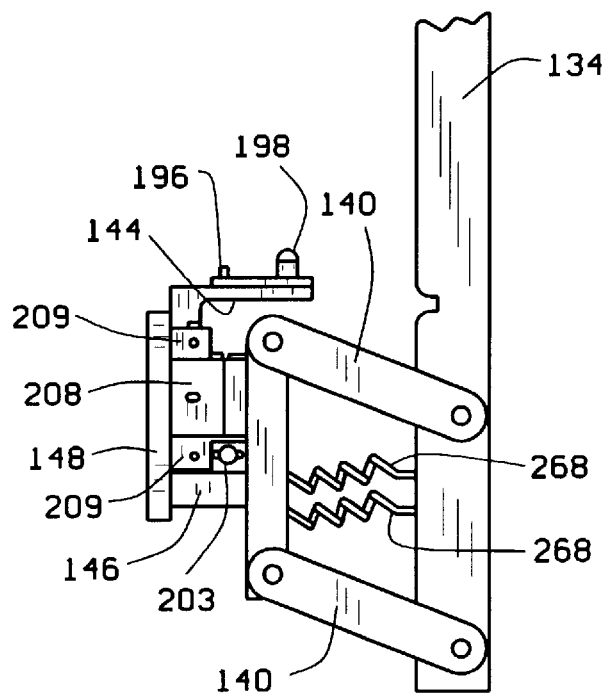

FIGS. 7A and 7B are front and side views, respectively, of extension unit 136 connected to rail assembly 122 illustrated in FIGS. 5A, 5B and 5C. Extension unit 136 includes a hydraulic cylinder 264 connected to control a pivot rod 266. Pivot rod 266 is coupled to extension arms 140. A rotation cylinder hose 268 extends from pivot rod bracket 270 to rotation assembly 250.

The above described delivery system does not heavily rely on the dexterity of the operator and facilitates precise positioning of a tool within a RPV. Such delivery system also facilitates eliminating a need for special, dedicated tools which, in the past, typically are required for each different task. The delivery system also is believed to facilitate reducing the amount of time required to perform inspections and repairs and reducing the operator radiation exposure per task.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. Apparatus for use in a nuclear reactor including a top guide and a substantially cylindrical shroud, the top guide having a plurality of openings extending therethrough and being substantially cylindrical, one end of the shroud located substantially adjacent the top guide, the shroud having an outer diameter substantially equal to an outer diameter of the top guide, a shroud head support flange assembly extending above the top guide and including a shroud head support flange having a plurality of seismic pins extending at least partially therein, said apparatus comprising:

a positioning unit configured to attach to the shroud head flange, and comprising a horizontal member, a radial member, and a z-axis adjustment assembly, said radial member extending from said horizontal member to said z-axis adjustment assembly;

a strong back assembly comprising a mast and an extension unit, said extension unit connected to said mast at one end thereof, said mast configured to attach to said positioning unit, said z-axis adjustment assembly comprising a mast coupling configured to attach to said mast, and an elongate screw threadedly attached to said coupling so that as said screw rotates, said coupling moves relative to said radial member; and a rail assembly connected to said extension unit, said rail assembly comprising a rail and a mounting plate movably secured to said rail.

2. Apparatus in accordance with claim 1 wherein said horizontal member comprises a plurality of slots and circular shaped openings therein, and at least one hydraulic unit mounted to said horizontal member.

3. Apparatus in accordance with claim 1 wherein said z-axis adjustment assembly further comprises a scale and pointer assembly for indicating a location of said coupling.

4. Apparatus in accordance with claim 1 wherein said extension unit comprises a four-bar linkage connected at one end to said mast, and a hydraulic cylinder positioned to control movement of said linkage.

5. Apparatus in accordance with claim 4 wherein said extension unit farther comprises a rotation assembly for rotating said rail assembly relative to said mast.

6. Apparatus in accordance with claim 1 wherein said rail assembly further comprises a motor coupled to said mounting plate for moving said mounting plate relative to said rail.

7. Apparatus in accordance with claim 6 wherein said rail assembly further comprises a plurality of suction cups for removable attachment to an inner surface of the shroud.

8. A delivery system for use in a nuclear reactor, said system comprising:

a positioning unit comprising a horizontal member having a plurality of slots and circular shaped openings therein, at least one hydraulic unit mounted to said horizontal member;

a strong back assembly comprising a mast and an extension unit, said mast configured to attach to said positioning unit, said extension unit connected to said mast at one end thereof and comprising a linkage connected at one end to said mast, and a hydraulic cylinder positioned to control movement of said linkage; and a rail assembly connected to said extension unit, said rail assembly comprising a rail and a mounting plate movably secured to said rail.

9. A delivery system in accordance with claim 8 wherein said positioning unit further comprises a radial member and a z-axis adjustment assembly, said radial member extending from said horizontal member to said z-axis adjustment assembly.

10. A delivery system in accordance with claim 9 wherein said z-axis adjustment assembly comprises a mast coupling configured to attach to said mast, and an elongate screw threadedly attached to said coupling so that as said screw rotates, said coupling moves relative to said radial member.

11. A delivery system in accordance with claim 10 wherein said z-axis adjustment assembly further comprises a scale and pointer assembly for indicating a location of said coupling.

12. A delivery system in accordance with claim 8 wherein said extension unit further comprises a rotation assembly for rotating said rail assembly relative to said mast.

13. A delivery system in accordance with claim 8 wherein said rail assembly further comprises a motor coupled to said mounting plate for moving said mounting plate relative to said rail.

14. A delivery system in accordance with claim 8 wherein said rail assembly further comprises a plurality of suction cups for removable attachment to an inner surface of the shroud.

* * * * *